(12) United States Patent
Heinrich

(10) Patent No.: US 8,918,280 B1
(45) Date of Patent: Dec. 23, 2014

(54) CONSTRAINT PROCESSING AS AN ALTERNATIVE TO FLIGHT MANAGEMENT SYSTEMS

(75) Inventor: Richard E. Heinrich, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 438 days.

(21) Appl. No.: 13/109,428

(22) Filed: May 17, 2011

(51) Int. Cl.
  *G06F 19/00* (2011.01)
  *G06G 7/70* (2006.01)
  *G06G 7/76* (2006.01)

(52) U.S. Cl.
  USPC ............... 701/416; 701/423; 706/15; 706/19; 244/175; 342/65

(58) Field of Classification Search
  USPC ............... 701/25–26, 300–301, 29, 528, 400, 701/410, 423, 416; 340/438, 435–436; 342/42, 46, 29, 65; 708/200; 706/15, 706/19; 244/175
  See application file for complete search history.

(56) References Cited

U.S. PATENT DOCUMENTS

| | | | | |
|---|---|---|---|---|
| 7,248,952 | B2 * | 7/2007 | Ma et al. .......................... 701/25 |
| 7,667,575 | B2 * | 2/2010 | Husak et al. ................. 340/10.2 |
| 7,891,004 | B1 * | 2/2011 | Gelvin et al. ................... 726/26 |
| 7,904,569 | B1 * | 3/2011 | Gelvin et al. ................. 709/229 |
| 7,912,630 | B2 * | 3/2011 | Alewine et al. .............. 701/34.4 |
| 7,912,742 | B2 * | 3/2011 | Trautman ......................... 705/5 |
| 7,917,333 | B2 * | 3/2011 | Grichnik et al. .............. 702/182 |
| 8,234,068 | B1 * | 7/2012 | Young et al. .................. 701/528 |
| 2006/0184294 | A1 * | 8/2006 | Ma et al. .......................... 701/25 |
| 2009/0087029 | A1 * | 4/2009 | Coleman et al. .............. 382/103 |
| 2009/0319170 | A1 * | 12/2009 | Madsen et al. ................ 701/200 |
| 2010/0185572 | A1 * | 7/2010 | Bonabeau et al. .............. 706/13 |
| 2011/0166898 | A1 * | 7/2011 | Zarrow ............................ 705/5 |
| 2011/0218733 | A1 * | 9/2011 | Hamza et al. ................. 701/213 |
| 2012/0154591 | A1 * | 6/2012 | Baur et al. .................... 348/148 |

OTHER PUBLICATIONS

Recursive optimal manoeuvring systems for maritime search and rescue mission; Nguyen, H.; Oceans '04. MTTS/IEEE Techno-Ocean '04; vol. 2; Digital Object Identifier: 10.1109/OCEANS.2004. 1405599; Pub. Year: 2004 , pp. 911-918 vol. 2.*

Worst-case and distributional robustness analysis of finite-time control trajectories for nonlinear distributed parameter systems Nagy, Z.K.; Braatz, R.D.' Control Systems Technology, IEEE Transactions on; vol. 11 , Issue: 5; Digital Object Identifier: 10.1109/TCST.2003. 816419; Pub. Year: 2003; pp. 694-704.*

(Continued)

*Primary Examiner* — Cuong H Nguyen
(74) *Attorney, Agent, or Firm* — Angel N. Gerdzhikov; Donna P. Suchy; Daniel M. Barbieri

(57) ABSTRACT

A method for providing trajectory planning for an aircraft based on constraint processing is disclosed. The method may be performed utilizing a computer or processor onboard the aircraft that is en route, through all phases of flight, to an end location. The trajectory planning method may comprise receiving a set of constraints during the flight of the aircraft; analyzing the set of constraints to determine an optimal trajectory between a current location of the aircraft and the end location, the optimal trajectory is determined based on compliance with the set of constraints; and dynamically adjusting the flight of the aircraft based on the optimal trajectory.

10 Claims, 4 Drawing Sheets

(56) References Cited

OTHER PUBLICATIONS

Autonomous State Estimation in Formation Flight; Sabatini, M.; Reali, F.; Palmerini, G.B.; Aerospace Conference, 2007 IEEE Digital Object Identifier: 10.1109/AERO.2007.352791 ; Pub. Year: 2007 , pp. 1-12.*

An efficient combinatorial optimization algorithm for optimal scheduling of aircraft arrivals at congested airports; Saraf, A.P.; Slater, G.L.; Aerospace Conference, 2006 IEEE; Digital Object Identifier: 10.1109/AERO.2006.1655877; publication Year: 2006.*

Dynamical systems complexity with a view towards air traffic management applications; Puechmorel, S. et al; Decision and Control, 2009 held jointly with the 2009 28th Chinese Control Conf. CDC/CCC 2009. Proceedings of the 48th IEEE Conf. on DOI: 10.1109/CDC.2009.5400549; Pub Year: 2009 , pp. 8369-8374.*

A novel variational approach for collision-free trajectory planning of robot manipulators; Zhu, Z.H. et al.; Intelligent Robots and Systems, 1999. IROS '99. Proceedings. 1999 IEEE/RSJ Inter. Conf.on; vol. 3; DOI: 10.1109/IROS.1999.811747 Publication Year: 1999 , pp. 1848-1853 vol. 3.*

On-line trajectory generation: Nonconstant motion constraints; Kroger, T.; Robotics and Automation (ICRA), 2012 IEEE International Conf. on; DOI: 10.1109/ICRA.2012.6225186; Publication Year: 2012 , pp. 2048-2054.*

Error characterization of flight trajectories reconstructed using Structure from Motion; Alix, D. et al.; Applied Imagery Pattern Recognition Workshop: Sensing for Control and Augmentation, 2013 IEEE (AIPR DOI: 10.1109/AIPR.2013.6749308 Publication Year: 2013 , pp. 1-15.*

Theoretical framework to costruct optimal flight safety diagnostic procedures; Opanasiuk, Y.; Methods and Systems of Navigation and Motion Control (MSNMC), 2012 2nd Inter. Conf.; DOI: 10.1109/MSNMC.2012.6475083; Pub. Year: 2012 , pp. 45-48.*

Research on the method of target reconstruction guidance; Huang Yuqiu ; Linshu, H.; Control and Decision Conference (CCDC), 2011 Chinese; DOI: 10.1109/CCDC.2011.5968996; Publication Year: 2011 , pp. 4369-4373.*

Trajectory reconstruction techniques for evaluation of ATC systems; Garcia, J. et al.; Digital Communications—Enhanced Surveillance of Aircraft and Vehicles, 2008. TIWDC/ESAV 2008. Tyrrhenian International Workshop on; DOI: 10.1109/TIWDC.2008.4649050; Publication Year: 2008 , pp. 1-6.*

* cited by examiner

CONSTRAINT PROCESSING AS AN ALTERNATIVE TO FLIGHT MANAGEMENT SYSTEMS

TECHNICAL FIELD

The present disclosure relates generally to aircraft flight management and more particularly to system for providing trajectory planning based on constraint processing.

BACKGROUND

Providing a safe operating environment for day to day operations is an essential requirement for an air traffic control system. A traditional air traffic control system may coordinate flight planning between various airspace users. This effort may be focused on ground based systems that are managed to support user requested trajectories. However, with the increase in air traffic, requirements for improved environmental performances, and the need for flexibility in planning and execution, the amount of processing required of such air traffic control systems increases rapidly.

A flight management system, or FMS, is a computer system onboard an aircraft that may automate certain in-flight tasks. For example, a conventional FMS may use various sensors to determine the position of the aircraft (e.g., utilizing satellite positioning, inertial navigation, radio navigation or the like), and guide the aircraft along trajectories plan pre-established by air traffic controllers. However, the ground systems that prepare such trajectories and the aircraft that executes these trajectories may be rigid and rule based. They may not be able to take into consideration any dynamic or real-time operational and environmental factors. Therein lies the need for a trajectory planning method that takes such factors into consideration.

SUMMARY

The present disclosure is directed to a system and method for providing aircraft centric trajectory planning based on constraint processing. Instead of merely executing flight plans pre-established by air traffic controllers, the aircraft centric trajectory planning takes into consideration the dynamic or real-time operational and environmental factors, and utilizes constraint processing to provide trajectory optimizations between the end points of the flight. The trajectory planning method may be performed utilizing a computer or processor onboard the aircraft. The method may include receiving a starting location and an ending location for a phase of flight of the aircraft; receiving a set of constraints from multiple systems and sensors for the phase of flight of the aircraft, wherein operations of the aircraft during the phase of flight are subject to the set of constraints; and analyzing the set of constraints to determine an optimal trajectory between the starting location and the ending location, the optimal trajectory is determined based on compliance with the set of constraints.

A further embodiment of the present disclosure is directed to a trajectory planning method for an aircraft in flight to an end location. The method may include receiving a set of constraints during the flight of the aircraft; analyzing the set of constraints to determine an optimal trajectory between a current location of the aircraft and the end location, the optimal trajectory is determined based on compliance with the set of constraints; and dynamically adjusting the flight of the aircraft based on the optimal trajectory.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present disclosure may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to a system and method for providing aircraft centric trajectory planning based on constraint processing. Instead of merely executing flight plans pre-established by air traffic controllers, the aircraft centric trajectory planning takes into consideration the dynamic or real-time operational and environmental factors, and utilizes constraint processing to provide trajectory optimizations between the end points of the flight. Aircraft centric trajectory planning in accordance with the present disclosure provides decision support tools for pilots and air traffic controllers with abilities to manage changes and to resolve system constraints. Furthermore, aircraft centric trajectory planning may also reduce the amount of processing required of the ground control systems.

Figure 1:
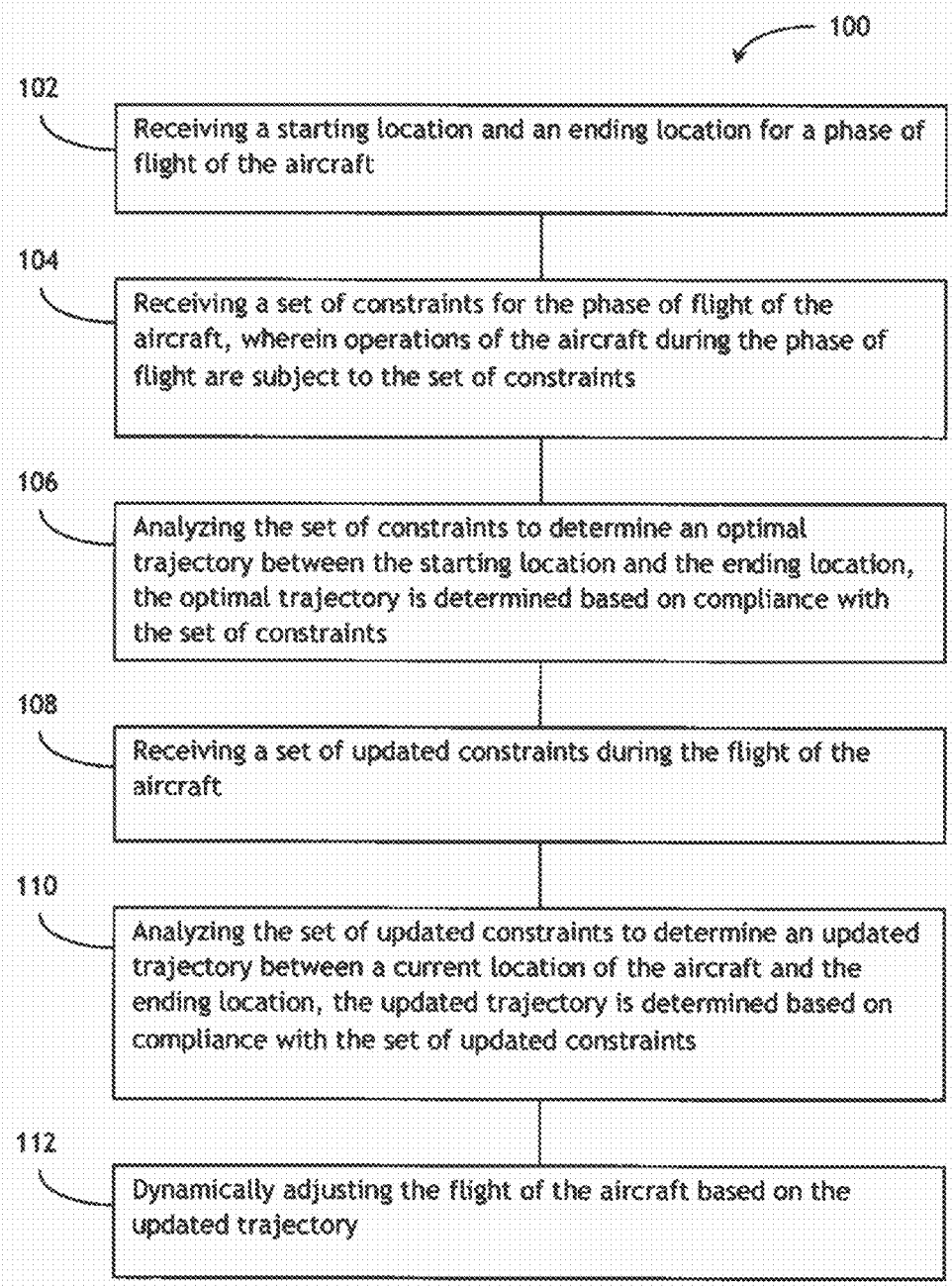
FIG. 1 is a flow chart illustrating a method for trajectory planning method for an aircraft based on constraint processing.
Figure 2:
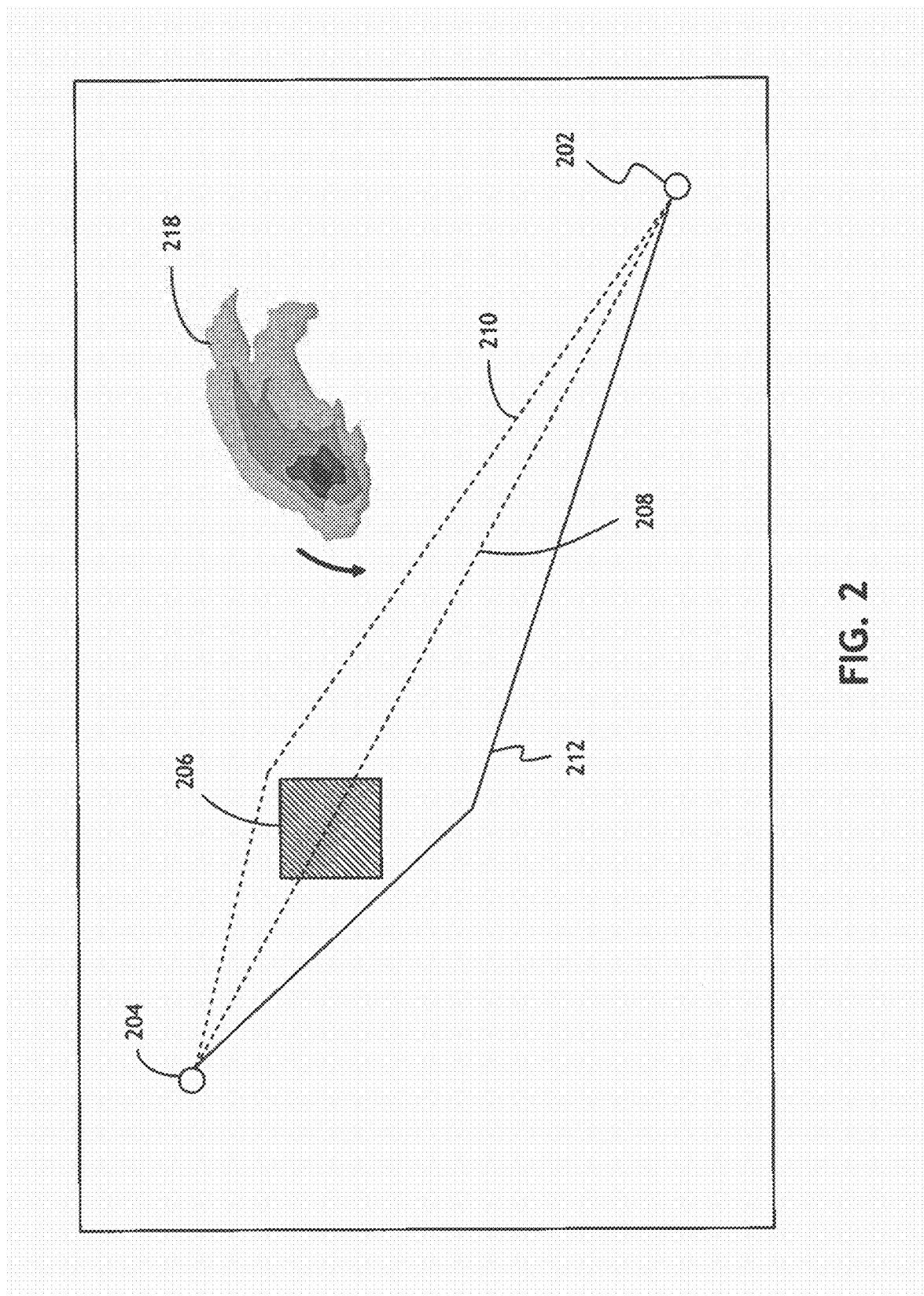
FIG. 2 is an illustration depicting an optimal trajectory determined based on a given set of constraints.
Figure 3:
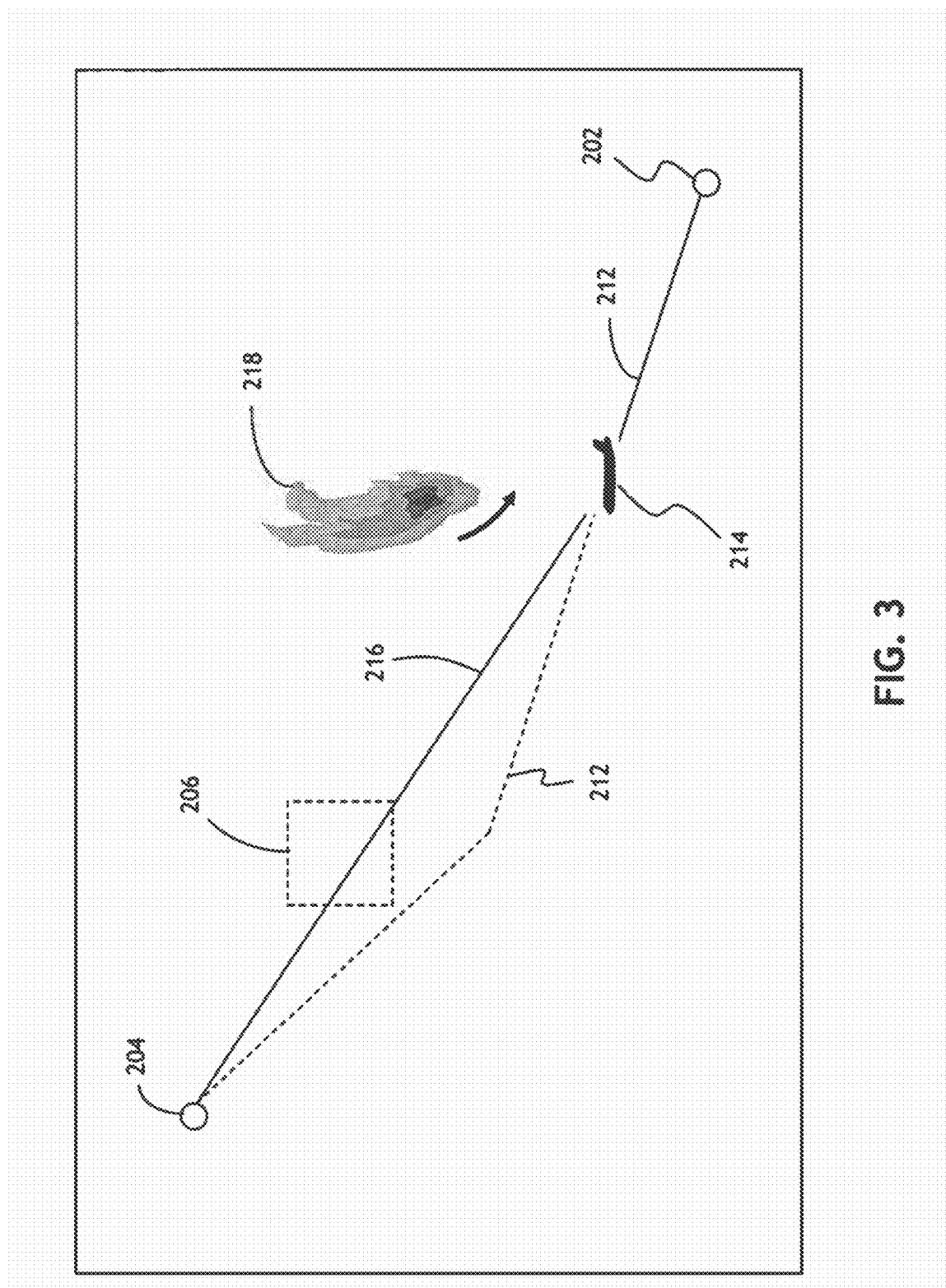
FIG. 3 is an illustration depicting an updated trajectory determined based on a set of updated constraints.

Referring generally to FIGS. 1 through 3. FIG. 1 shows a method 100 for providing aircraft centric trajectory planning based on constraint processing, and FIGS. 2 and 3 are illustrations depicting optimal trajectories determined based on the given constraints. When utilizing the method 100 for planning a trajectory for a phase of flight of the aircraft, only the end points (e.g., the starting and the ending locations) and a set of constraints may need to be specified. The trajectory planning method 100 may analyze the set of constraints to determine an optimal trajectory between the end points. For instance, step 102 may receive the starting location 202 and the ending location 204 as input from air traffic controllers, pilots or the like. It is contemplated that the starting and ending locations may refer to departure and destination locations. Alternatively, if the flight of an aircraft is divided into multiple phases, the end points of each particular phase may be referred to as a starting location and an ending location (for that particular phase), and the method 100 may be utilized to determine a trajectory between the end points of any given phase of flight.

The flight of the aircraft may be subject to various constraints. Such constraints may be based on traffic, weather and terrain in the airspace that the aircraft is currently operating within. Other constraints may include, for example, known or detected obstacles in the direction of travel that need to be avoided, availabilities of airspaces (e.g., temporary flight restrictions, special use airspaces or the like), aircraft performance constraints (e.g., when utilizing performance-based navigations), and various other factors. Furthermore, different aircraft operators may have different operational constraints/objectives. For example, a scheduled operator may be subject to time-based constraints where the aircraft may need to minimize its flight time or arrive at its destination within a pre-specified time range. In another example, an unscheduled operator may be subject to cost-based constraints where the aircraft may need to minimize its fuel consumption. It is contemplated that the various constraints described above are merely exemplary; an aircraft may be subject to other types of constraints, or a combination of constraints, without departing from the spirit and scope of the present disclosure.

The trajectory planning method 100 may receive the set of constraints that the aircraft is subjected to in step 104. For instance, traffic information may be provided as input to the trajectory planning method 100 via automatic dependent surveillance-broadcast (ADS-B), traffic information services-broadcast (TIS-B), traffic radars, ground traffic control stations or the like. Weather information may be provided as input to the trajectory planning method 100 via onboard weather radars, ground linked weather systems or the like. Similarly, terrain information may be provided as input to the trajectory planning method 100 via terrain databases or terrain detection radars or the like. Furthermore, potential obstacles in the direction of travel of the aircraft may be provided as input to the trajectory planning method 100 via obstacle databases (e.g., for known obstacles) or radar detections. In addition, if the aircraft is operating under a performance-based navigation specification, then the performance constraints/requirements may also be provided as input to the trajectory planning method 100.

Additional constraints that may be provided as input to the trajectory planning method 100 may include location-based airspace constraints. For example, a database may record the restricted airspace locations and provide them as input to the trajectory planning method 100. It is contemplated that certain airspace restrictions may be changed dynamically, and therefore the trajectory planning method 100 may be configured to receive up-to-date or real-time constraints via various wired or wireless communication means (e.g., radio communications or Notice To Airmen (NOTAMs)). Such airspace constraints may include, for example, temporary flight restrictions, special use airspace, sector boundaries, curfews, airport conditions or the like.

FIG. 2 is an illustration depicting some potential trajectories between the starting location 202 and the ending location 204 as well as their relationships with respect to a given set of constraints. In this example, trajectory 208 may be able to provide the shortest distance between the starting location 202 and the ending location 204, but it may fail to comply with a location-based constraint 206 that establishes a restricted airspace. Trajectory 210 may be able to bypass the location-based constraint 206 while still arrive at the ending location 204 within a pre-specified time range, but it may not be able to avoid a storm 218 (a weather-based constraint) reportedly heading towards the direction of travel. Trajectory 212, on the other hand, may be able to bypass the location-based constraint 206, arrive at the ending location 204 within a pre-specified time range, and does not intersect with the detected path of the storm 218. Therefore, trajectory 212 may be deemed to be the optimal trajectory between the starting location 202 and the ending location 204 for this set of constraints. It is understood, however, that the constraints listed above are merely exemplary. Various other types of constraints (e.g., avoiding traffics, comply with performance requirements or the like) may be taken into consideration by the trajectory planning method 100.

In one embodiment, step 106 may analyze the set of constraints to determine an optimal trajectory between the starting location and the ending location. If one or more feasible trajectories (i.e., trajectories that comply with the constraints) are found between the starting location and the ending location, then an optimal trajectory may be selected from the feasible trajectories. It is contemplated that different operators may utilize different objective functions for selecting the optimal trajectory. For instance, if two feasible trajectories are both fully in compliance with the constraints, one operator may prefer the trajectory that utilizes the least amount of fuel (provided that all other constraints are satisfied) while another operator may prefer another trajectory that provides the least amount of flight time (provided that all other constraints are satisfied). Once the optimal trajectory is selected, the aircraft may be directed to operate according to the selected optimal trajectory.

On the other hand, a notice may be generated if no feasible trajectory exists between the starting location and the ending location (i.e., no trajectory would fully satisfy all of the constraints). Alternatively, certain constraints may be given higher importance levels than other constraints, in this manner, one or more potential trajectories may be provide with indications of the constraints that are not satisfied. For instance, if it is not feasible to bypass a restricted airspace and still satisfy the time constraints, and suppose that compliance with the restricted airspace is deemed more important, then a potential trajectory that bypasses the restricted airspace but arrives at a time later than expected may be provided with an indication that the time constraints are not satisfied. That is, step 106 may try to find an optimal trajectory that is in compliance with all constraints first. If not all constraints can be satisfied, step 106 may then try to find a trajectory that may comply with as many constraints as possible (preferably constraints with higher importance levels), which may be considered as the optimal trajectory for the given set of constraints.

The aircraft may operate based on the optimal trajectory determined in step 106. However, it is contemplated that some constraints may change while the aircraft is in flight. For example, the opening and closing of special use airspace (daily and/or seasonally) may allow more direct routing and may happen after an aircraft has been dispatched. In another example, necessary path adjustments during a delegated separation maneuver may require an assessment of traffic, terrain or the like in order to choose path alternatives while still ensuring that the required time of arrival (RTA) can be maintained. Time of arrival may be expressed in various terms including, but not limited to, estimated time of arrival (ETA), contracted time of arrival (CTA), projected time of arrival (PTA), and their equivalents. In addition, other path constraints on the aircraft and other ground system described constraints may also change dynamically and therefore may be taken into consideration for dynamic trajectory planning.

FIG. 3 is an illustration depicting dynamic trajectory planning that takes into consideration the dynamic or real-time operational and environmental factors. In this example, the aircraft is en route to the ending location 204 according to trajectory 212 determined earlier. Suppose, for illustrative purposes, that the restricted airspace 206 is now open for public access, which effectively removes the location-based constraint that required the bypass before. In light of the opening of the restricted airspace 206, trajectory 212 may no longer be the optimal trajectory between the current location 214 of the aircraft and the ending location 204. Instead, a direct path from the current location 214 of the aircraft to the ending location 204, provided that the direct path is still in compliance with other constraints (e.g., it still does not intersect with the path of the storm 218), may be deemed to be the updated optimal trajectory 216 for the set of updated constraints. The flight of the aircraft may then be adjusted dynamically according to the update optimal trajectory 216.

In one embodiment, step 108 may receive a set of updated constraints during flight of the aircraft. The updated constraint set may include new constraints that have been introduced or changes made to any previously received constraints. For example, if a new curfew is imposed while the aircraft is in flight, and if the existing trajectory is set to traverse through an area under the newly imposed curfew, the existing trajectory may need to be modified accordingly. In another example, suppose that the weather forecast provided prior to the departure was inaccurate, and if the existing trajectory is set to bypass a storm that no longer poses a threat, the existing trajectory may also be modified accordingly. It is understood that other constraint changes may also be received without departing from the spirit and scope of the present disclosure. Such constraints may include, but are not limited to, opening and closing of special use airspace, lifting and imposing of curfews, changes in traffic and terrain conditions, as well as various other constraints.

Step 110 may analyze the set of updated constraints to determine one or more feasible trajectories between the current location of the aircraft and the ending location. An optimal trajectory may be selected among the feasible trajectories similar to the selection process described above. If the optimal trajectory determined based on the updated constraints (referred to as the updated trajectory) is the same as the existing trajectory, then no change is needed. However, if the updated trajectory is different from the existing trajectory, step 112 may dynamically adjust the flight of the aircraft based on the updated trajectory. In one embodiment, the updated trajectory may be provided to a ground station for approval prior to adjusting the flight of the aircraft; and the flight of the aircraft may be adjusted based on the updated trajectory when it is approved. In addition, approved trajectories may be recorded in the System Wide Information Management (SWIM) or the like to facilitate sharing of air traffic management information.

It may be possible that no feasible trajectory can be found between the current location of the aircraft and the ending location that fully complies with all of the updated constraints. In this case, certain constraints may be given higher importance levels than other constraints as previously described. For instance, if the existing trajectory is set to traverse directly through a special use airspace which is now closed, the aircraft may have difficulty bypassing the closed special use airspace and still satisfy the time constraints. For illustrative purposes, suppose that compliance with the special use airspace constraint is deemed more important than the time constraints, then a potential trajectory that bypasses the special use airspace but arrives at a time later than expected may be provided with an indication that the time constraints are not satisfied.

It is contemplated that steps 108 through 112 may be repeated as a continuous process during the flight of the aircraft in order to assess new constraints as they develop. Some constraints may expire and therefore may be removed from the constraint set. Furthermore, the path development capabilities of a traditional FMS may be utilized to facilitate the determination of path alternatives.

Figure 4:
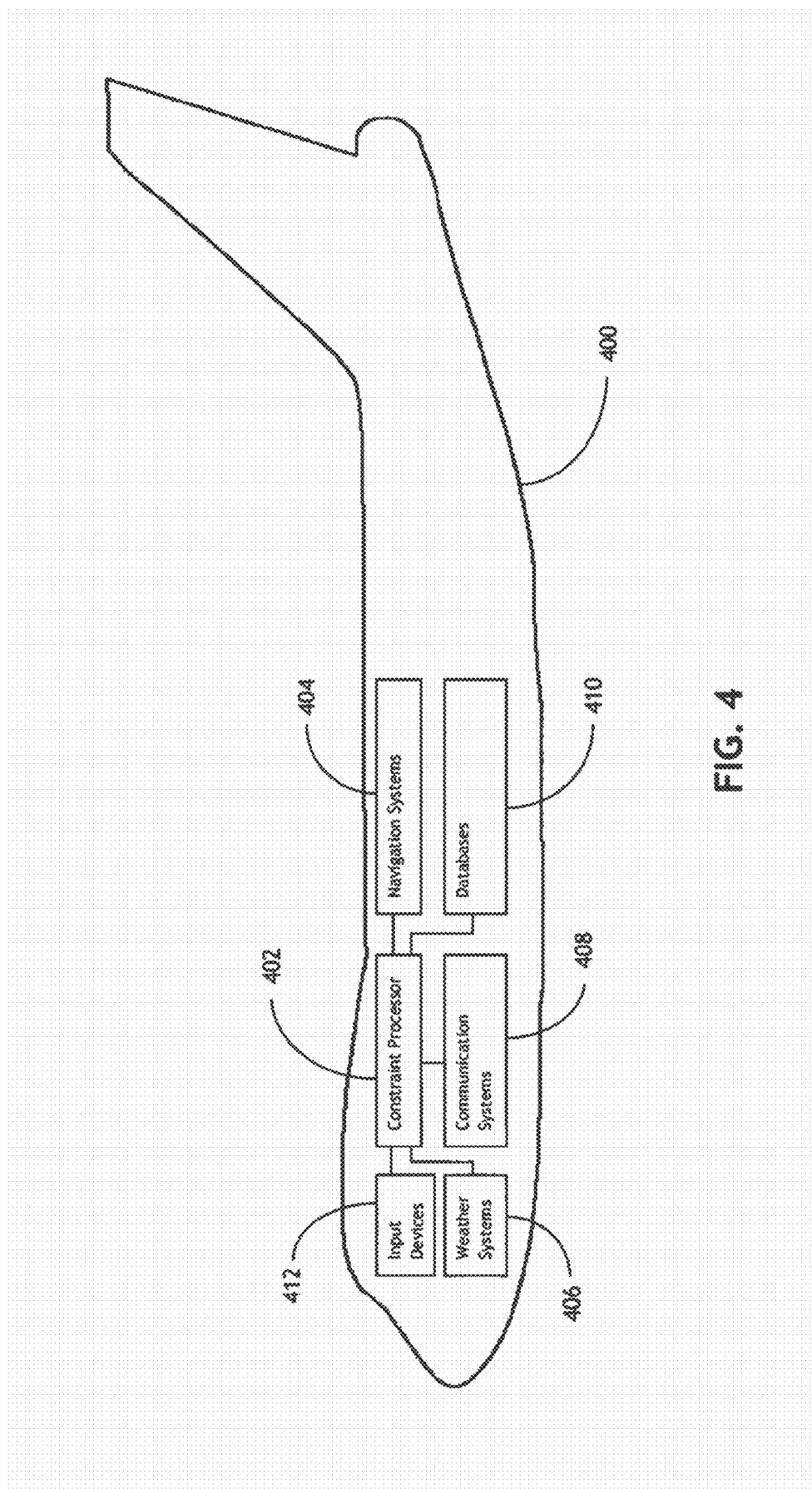
FIG. 4 is a block diagram illustrating a constraint processing system for providing trajectory planning for an aircraft.

The trajectory planning method in accordance with the present disclosure may be performed utilizing a computer or processor (referred to as a constraint processor 402) onboard the aircraft 400, as shown in FIG. 4. The constraint processor 402 is configured to fuse the constraints with the current trajectory and determine if the current trajectory need to be modified based on the given constraints. The constraint processor 402 may be communicatively connected (e.g., via various wired or wireless communication means) with other components of the aircraft 400. For instance, the constraint processor 402 may be communicatively connected with navigation systems 404 for positional information, weather systems 406 for weather related information, communication systems 408 for ground and/or aerial communications, and various databases 410 that may provide recorded information such as terrain, known obstacles or the like. It is contemplated that the constraint processor 402 may be communicatively connected with other components (e.g., input devices 412 for receiving pilot inputs) onboard the aircraft 400 without departing from the spirit and scope of the present disclosure.

In one embodiment, to facilitate integration of various constraints, the constraint processor 402 may include a data interface configured for receiving inputs from various components and provide a set of uniformly formatted constraints to a processing module of the constraint processor 402. An exemplary format may specify the following attributes for each constraint:

| Field | Attribute |
|---|---|
| 1 | Identifier |
| 2 | 4D Characteristics |
| 3 | Motion Characteristics |
| 4 | Error Characteristics |
| 5 | Aging Characteristics |
| 6 | Importance Level |

For example, when information regarding a particular weather pattern (e.g., a storm) is received, such information may be assigned an identifier and the rest of the attributes may be populated based on the received information. For instance, the 4D characteristics (i.e., a three-dimensional space and a temporal dimension) may describe the location and time of the storm when it is detected; the motion characteristics may describe the movement of the storm; the error characteristics may describe the accuracy of the detection; the aging characteristics may describe whether the storm may decay over time; and the importance level may describe how important/critical it is for the aircraft to bypass the storm.

In another example, when traffic information regarding other aircraft nearby is received (e.g., via ADS-B, traffic radars, ground traffic control stations or the like), such information may also be assigned an identifier and the rest of the attributes may be populated based on the received traffic information. For instance, the 4D characteristics may describe the location and time of the other aircraft; the motion characteristics may describe the movement of the traffic; the error characteristics may describe the accuracy of the detection; the aging characteristics may describe when the other aircraft is no longer a concern. The importance level of this constraint, for example, may be higher than that of the weather constraint (in the example above).

The importance level may be predetermined based on the types of constraints. For example, a traffic constraint (e.g., avoiding traffic collations) may take precedence over avoiding a weather pattern. Alternatively/additionally, the importance levels may be assigned systematically based on various factors including the characteristics (e.g., error, aging and the like) of the constraints. For example, a traffic constraint that is going to expire shortly may not be as important as a weather constraint that indicates a severe storm directly ahead of the direction of travel of the aircraft. It is contemplated that different algorithms may be utilized for assigning importance levels without departing from the spirit and scope of the present disclosure.

It is also contemplated that not all constraints are required to specify every exemplary field described above, in which case the unspecified fields may be indicated as "null". For example, an established restricted area may be stationary and therefore may not have any motion characteristics. In another example, constraints such as minimizing fuel consumptions may not have any 4D and motion characteristics.

It is understood that the constraint format described above is merely exemplary. Different formatting standards may be utilized without departing from the spirit and scope of the present disclosure. Furthermore, it is understood that the types of constraints described above are merely exemplary. Various other types of constraints may be populated in a similar manner as describe. The types of constrains may include, but are not limited to, time-based constraints (e.g., minimizing fly time, required time of arrival, or the like), cost-based constraints (e.g., with respect to fuel consumptions or the like), location-based constraints (e.g., with respect to airspace availabilities or the like), weather-based constraints, terrain-based constraints, traffic-based constraints, or performance constraints.

It is understood that the present disclosure is not limited to any underlying implementing technology. The present disclosure may be implemented utilizing any combination of software and hardware technology. The present disclosure may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A constraint processor for providing trajectory planning for an aircraft in flight to an end location, the constraint processor positioned onboard the aircraft, the constraint processor comprising:
    a data interface configured for receiving a set of constraints during the flight of the aircraft, the set of constraints including at least one of: a time-based constraint, a cost-based constraint, a location-based constraint, a weather-based constraint, a terrain-based constraint, a traffic-based constraint, or a performance constraint, wherein each particular constraint of the set of constraints includes: an error attribute specifying a likelihood of errors associated with said particular constraint and an aging attribute specifying an expiration time of said particular constraint; and
    a processing module communicatively connected with the data interface, the processing module configured for:
        assigning to each particular constraint of the set of constraints an importance level based on at least the error attribute and the aging attribute of said particular constraint, wherein a relatively lower likelihood of errors associated with said particular constraint and a relatively longer time remaining till the expiration time of said particular constraint correspond to a relatively higher importance level assignment of said particular constraint;
        analyzing the set of constraints to determine an optimal trajectory between a current location of the aircraft and the end location, the optimal trajectory is determined based on compliance with the set of constraints, wherein when the set of constraints cannot be satisfied simultaneously, a trajectory that satisfies a maximum number of relatively higher importance level constraints in the set of constraints is deemed the optimal trajectory; and
        dynamically adjusting the flight of the aircraft based on the optimal trajectory.

2. A trajectory planning method for an aircraft in flight to an end location, the method being performed utilizing a computer or processor onboard the aircraft, the method comprising:
    receiving a set of constraints during the flight of the aircraft, the set of constraints including at least one of: a time-based constraint, a cost-based constraint, a location-based constraint, a weather-based constraint, a terrain-based constraint, a traffic-based constraint, or a performance constraint, wherein each particular constraint of the set of constraints includes: an error attribute specifying a likelihood of errors associated with said particular constraint and an aging attribute specifying an expiration time of said particular constraint;
    assigning to each particular constraint of the set of constraints an importance level based on at least the error attribute and the aging attribute of said particular constraint, wherein a relatively lower likelihood of errors associated with said particular constraint and a relatively longer time remaining till the expiration time of said particular constraint correspond to a relatively higher importance level assignment of said particular constraint;
    analyzing the set of constraints to determine an optimal trajectory between a current location of the aircraft and the end location, the optimal trajectory is determined based on compliance with the set of constraints, wherein when the set of constraints cannot be satisfied simultaneously, a trajectory that satisfies a maximum number of relatively higher importance level constraints in the set of constraints is deemed the optimal trajectory; and
    dynamically adjusting the flight of the aircraft based on the optimal trajectory.

3. The trajectory planning method of claim 2, wherein the set of constraints is formatted uniformly, and each one of the set of constraints includes: an identifier field, a dimensional characteristics field, a motion characteristics field, an error characteristics field, an aging characteristics field, and an importance level field.

4. The trajectory planning method of claim 2, further comprising:
   indicating a set of unsatisfied constraints when the set of constraints cannot be satisfied simultaneously, the set of unsatisfied constraints being a subset of the set of constraints.

5. The constraint processor of claim 1, wherein the processing module is further configured for:
   waiting for approval of the optimal trajectory prior to dynamically adjusting the flight of the aircraft based on the optimal trajectory.

6. The constraint processor of claim 1, wherein the time-based constraint specifies a pre-specified time range, the cost-based constraint specifies a fuel consumption requirement, the location-based constraint specifies availability of at least one airspace, the weather-based constraint specifies at least one weather-related event to avoid, the terrain-based constraint specifies at least one terrain condition to avoid, the traffic-based constraint specifies at least one traffic condition to avoid, and the performance constraint specifies a performance-based navigation specification.

7. The constraint processor of claim 1, wherein the processing module is further configured for:
   indicating a set of unsatisfied constraints when the set of constraints cannot be satisfied simultaneously, the set of unsatisfied constraints being a subset of the set of constraints.

8. The trajectory planning method of claim 2, wherein the time-based constraint specifies a pre-specified time range, the cost-based constraint specifies a fuel consumption requirement, the location-based constraint specifies availability of at least one airspace, the weather-based constraint specifies at least one weather-related event to avoid, the terrain-based constraint specifies at least one terrain condition to avoid, the traffic-based constraint specifies at least one traffic condition to avoid, and the performance constraint specifies a performance-based navigation specification.

9. The trajectory planning method of claim 2, further comprising:
   waiting for approval of the optimal trajectory prior to dynamically adjusting the flight of the aircraft based on the optimal trajectory.

10. The constraint processor of claim 1, wherein the data interface is further configured for:
    formatting the set of constraints prior to providing the set of constraints to the processing module, wherein each one of the set of formatted constraints includes at least one of: an identifier field, a dimensional characteristics field, a motion characteristics field, an error characteristics field, an aging characteristics field, and an importance level field.

* * * * *